Oct. 17, 1967  F. N. STEPHENS ET AL  3,347,725
METHOD OF MAKING TUBULAR THERMAL INSULATION
Filed Feb. 27, 1963  7 Sheets-Sheet 1
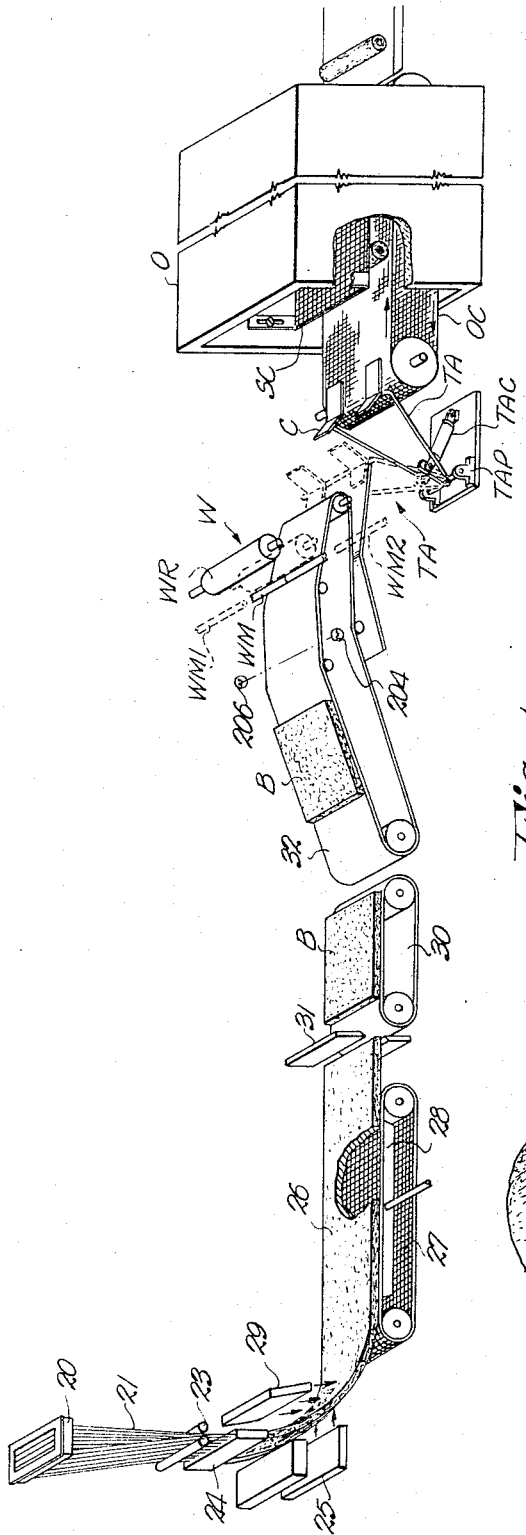
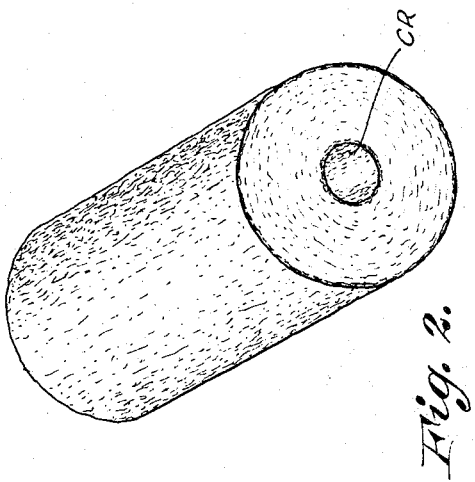
INVENTORS.
Frederick N. Stephens
Stuart J. Burhans
Joseph T. Warkoczewski
Jack M. Taylor
BY Scofield, Kokjer, Scofield & Lowe
ATTORNEYS.

INVENTORS.
Frederick N. Stephens
Stuart J. Burhans
Joseph T. Warkoczewski
Jack M. Taylor BY *Scofield, Kokjer, Scofield & Lowe*

ATTORNEYS.

INVENTORS.
Frederick N. Stephens
Stuart N. Burhans
Joseph T. Warkoczewski
Jack M. Taylor
BY Scofield, Kokjer, Scofield & Lowe
ATTORNEYS.

INVENTORS.
Frederick N. Stephens
Stuart J. Burhans
Joseph T. Wankoczewski
Jack M. Taylor

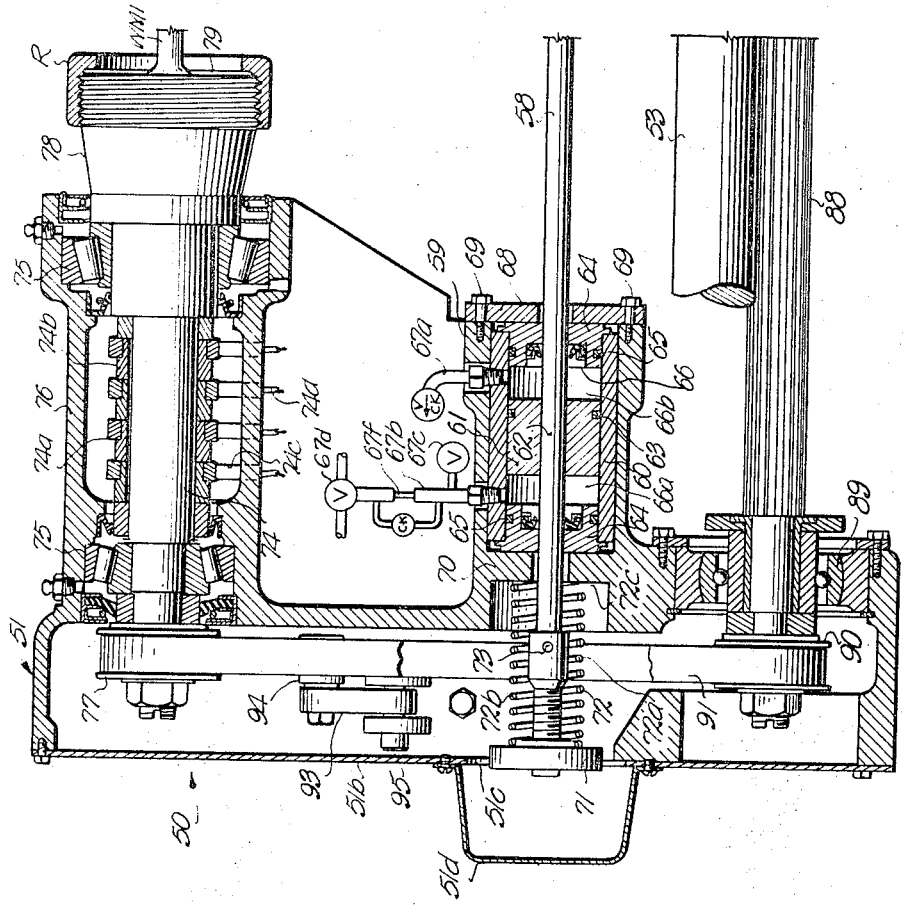

Oct. 17, 1967  F. N. STEPHENS ET AL  3,347,725
METHOD OF MAKING TUBULAR THERMAL INSULATION
Filed Feb. 27, 1963                                           7 Sheets-Sheet 6

INVENTORS.
Frederick N. Stephens
Stuart J. Burhans
Joseph T. Warkoczewski
Jack M. Taylor
BY Scofield, Kokjer, Scofield & Lowe
ATTORNEYS.

INVENTORS.
Frederick N. Stephens
Stuart J. Burhans
Joseph T. Warkoczewski
Jack M. Taylor

United States Patent Office 3,347,725
Patented Oct. 17, 1967

3,347,725
METHOD OF MAKING TUBULAR THERMAL INSULATION
Frederick N. Stephens, Leawood, Kans., Stuart J. Burhans, Kansas City, Mo., and Joseph T. Warkoczewski, Overland Park, and Jack M. Taylor, Kansas City, Kans., assignors, by mesne assignments, to Certain-Teed Products Corporation, Ardmore, Pa., a corporation of Maryland
Filed Feb. 27, 1963, Ser. No. 261,408
3 Claims. (Cl. 156—184)

This invention relates broadly to the manufacture of tubular thermal insulation members composed of resin bonded fibers, for example, pipe covering and the like. More particularly, it deals with a method and apparatus for producing such articles which makes it possible to eliminate entirely the necessity of using individual molds for conforming and maintaining the article in the desired tubular shape during the curing of the binder.

It is the usual practice in the manufacture of pipe covering or insulation ducts of carefully controlled density and dimensions to wrap a mat of intermixed fibers and uncured binder onto a mandrel, then confine the wound up mat and mandrel within a hollow mold conforming in shape and dimensions with the outside configuration of the article to be produced, and apply sufficient heat to the confined mat as to result in curing of the binder and the setting of the product in its final shape and condition. The article must then be removed from the mandrel and mold and the latter components returned to a station from which they can again be used to form a new article.

The procedure briefly described above, while quite satisfactory in obtaining a high quality product, still has numerous shortcomings, particularly in attempting to use it for high volume production and in the manufacture of small diameter articles. For every given size of article there must be provided a large quantity of identical mandrels and molds, and complex equipment is required in order to maintain an operation in which the mat is being used up as fast as it is produced. Each mandrel is required to be separable from the wind-up drive mechanism in order that the mandrel may travel with the mat through the curing stage, and new mandrels must be positioned to receive the mat as it advances from the mat generating equipment. Moreover, if the article is produced in different sizes, each size requires a full complement of properly dimensioned mandrels and molds.

One of the objects of the present invention is to provide a method of producing tubular articles of the character described which permits the manufacture of such articles to carefully control dimensions and densities without, however, requiring the confining of the product on a mandrel or within a mold during the final curing stage. This object, as well as the others hereinafter set forth, is achieved in part through the novel steps of subjecting the internal wall of the wound, but yet uncured mat, while the latter is in place on the mandrel, and while the mandrel is rapidly rotating, to a quick precuring and forming operation which has the result of producing on said wall a continuous tough shape retaining skin which conforms, in inside dimension, to the final configuration sought for the product. Simultaneously with the quick curing of the skin, the mass of the mat is, by radial pressure, compressed to substantially the density desired in the final product. The curing of said internal periphery and the preforming of the main body proceeds only to a point where the internal skin is sufficiently stable as to give, and retain the product in its desired final configuration. Thereupon the partially cured article (or "preform") is removed intact from the forming mandrel and transported in this state to a final stage in wihch that portion of the mat outwardly of the skin (which is the major portion thereof) is subjected to curing and final forming. Since the partially cured article is, in and of itself, capable of substantially maintaining its shape during the necessary handling thereafter, individual molds are not required, nor is any internal support necessary, and final curing is obtained by passing the article through a curing zone completely unencumbered by any internal or external individual molds. It is a special feature of the invention that for any given size article we require but a single windup mandrel, and that mandrel is required to support the mat for only a fraction of the time interval necessary for complete curing of the article.

Another object of the invention is to provide a method for producing articles of the character described which makes it possible to form and prepare the article for curing as fast as a single line of mat generating equipment can supply blanks of uncured mat.

Yet another object of the invention is to provide a method for producing articles of the character described which, in addition to the advantages set forth above, makes possible the production of such articles from a single line of mat generating equipment at a much faster time rate than heretofore had been thought possible.

A further object of the invention is to provide novel apparatus for practicing the method steps of the invention. In particular, among the principal objectives of the invention in this regard are (1) to provide equipment wherein the uncured mat is rapidly wound upon a mandrel and formed into the desired tubular shape without the use of special belts or other bulky wrapping equipment; (2) wherein the portions of the wrapped mat immediately adjacent the internal surface is quickly cured to form a tough dimensionally stable continuous skin which is strong enough to maintain the shape and dimensions of the tubular article when freed from the mandrel, despite the uncured state of the binder in the annular portion outwardly of the skin; (3) wherein the uncured mat is pressure packed during winding and formation of the skin into substantially the final density and configuration desired for the product; (4) wherein the mandrel can rapidly be disengaged from the partially cured article and quickly repositioned to receive a new portion of flat mat from the source of supply; (5) wherein the partially cured preform is rapidly displaced from the wrapping station to clear the way for incoming mat; (6) wherein the handling of the precured article is gentle, yet rapid; and (7) wherein by simply changing the size of the mandrel and/or making a few minor adjustments, the apparatus is readily adapted to producing a wide variety of differently dimensioned tubular members.

Other and further objects of the invention together with the features of novelty appurtenant thereto will appear in the course of the following description.

In the accompanying drawings which form a part of the specification and are to be read in conjunction therewith, and in which like reference numerals and symbols indicate like parts in the various views;

FIG. 1 is a schematic perspective view showing a typical production line functioning and constructed in accordance with the invention;

FIG. 2 is a greatly enlarged perspective view showing a lengthwise section of a completed tubular article made in accordance with and on the apparatus of the invention;

FIG. 7 is an enlarged end view of one of the reciprocable mandrel heads, parts being broken away for purposes of illustration;

FIG. 8 is a sectional view through the head, being taken generally along the line 8—8 of FIG. 7 in the direction of the arrows;

*General description*

Figure 3:
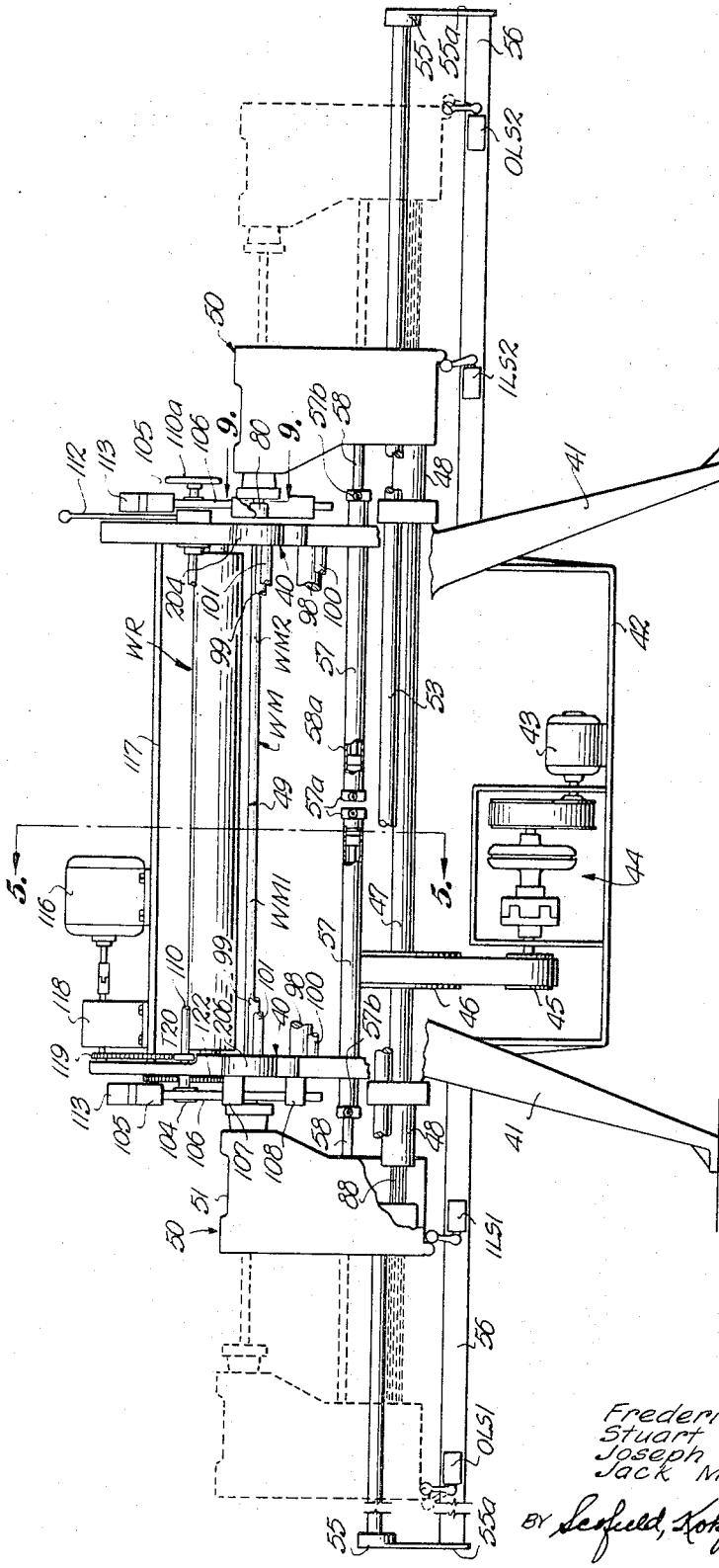
FIG. 3 is an elevational view taken from the input side of the wrapping and preforming assembly, portions of the framework, the conveyor belts and its supporting rolls removed or broken away for purposes of illustration.

Referring to the drawings and initially to FIG. 1, this figure illustrates schematically a typical continuous process embodying the features of the invention. Molten glass is fed through a bushing 20 to form downwardly moving primary fibers 21. The primaries may be drawn uniformly by means of powered rollers 23 which bring the primaries into a substantially planar relationship and feed them through guide 24. A hot gaseous blast is delivered by blast throat 25 transversely against the primaries to attenuate and form them into fine microfibers which are directed toward and deposited in mat form as at 26 on the foraminous conveyor 27. A suction box 28 is provided beneath the upper flight of conveyor 27 to assist in obtaining proper deposit of the fibers on the conveyor. During the transition from the blast area to the conveyor a heat reactive binder, preferably a thermosetting resin, is intermixed with the fibers, being delivered through distributing head 29.

The matted mixture of fibers and resin is delivered from the end of the foraminous forming conveyor 27 to a pickup conveyor 30, and a shear 31 is utilized to cut the mat into blanks or pelts B of proper length for the subsequent forming operation. This conveyor is driven at greater speed than the forming conveyor in order to effect a separation between succesive blanks.

From the pickup conveyor the blanks B are successively transferred to the input end of a still faster moving conveyor belt 32 which is a part of the wrapping and forming machine W to be described in full detail hereinafter. For the purposes of obtaining an initial and preliminary impression of the over-all apparatus, it suffices to note at this point that belt 32 serves to advance the blank B toward and beneath and into contact with a heated wrapping mandrel WM rapidly rotating in the counterclockwise direction as viewed in FIG. 1, in such fashion that the portion of the mat that contacts the mandrel adheres thereto by the binder in the mat. A conventional drive is provided for conveyor 32, for example, an electric motor (not shown), connected with the left hand roller support for the belt.

The mandrel WM serves to pick the pelt or blank from conveyor 32 and wrap it tightly into a spiral wrap around the mandrel. During its stay on mandrel WM, wrapped up blank has formed on its inner surface a skin of sufficient thickness and integrity that when the mandrel is removed the product will be generally self-supporting on its inside diameter. While the blank is wrapped on mandrel WM, a heated, shiftable finish roller WR is moved from its solid line position of FIG. 1 into a position spaced from the mandrel WM substantially equal to the desired final wall thickness to be given the tubular product, and the mandrel and roller are driven at synchronized speeds with the speed of belt 32 for a selected period of time necessary to effect the formation by the heated mandrel WM on the inside wall of the wrapped blank a thin, tough skin, as previously described. When the skin has been formed, and following return of the roller WR to the broken line position, the mandrel WM, which is composed of two oppositely reciprocable half length WM1 and WM2, is separated from the tubular preform by pulling the mandrel sections from the inside of the preform, as shown in broken lines.

Once freed from the mandrel, the preform is directed to the spaced cradles C at the upper end of a pivotal transfer arm TA. Am TA is pivoted as at TAP and is shifted clockwise by transfer arm cylinder TAC to the upper flight of a formainious oven conveyor OC which serves to advance the preform through the oven O. The oven is of the type in which heated air is blown vertically therethrough. During its movement through the oven the preform is reversely rolled against an upper static screen SC which is spaced above the upper flight of oven conveyor OC a distance such that the portion of the preform outwardly of the interior skin will be formed and held in its desired thickness. When it emerges from the oven, the product is completely cured and it can thereafter be slit longitudinally as taught in Stephens et al. Patent No. 2,778,759, to provide a structure which can be laterally applied to a pipe to thermally insulate the same.

General information as to desired fiber diameters and binder constituency for a satisfactory pipe covering of the type herein envisioned can be found in the aforementioned patent. The present invention deals principally with the process steps carried out and apparatus for effecting same in the wrapping and preforming section W and transfer W to the oven conveyor OC, and it is believed that sufficient information as to provide a preliminary understanding of the invention and its manner of cooperation in a continuous process has been given.

However, as will become evident as the description proceeds, the subject matter of the invention can also be used in a process in which the uncured blanks B are preformed in one area and subsequently transferred to another area and deposited by hand on the pickup conveyor 32.

*The wrapping and preforming apparatus*

Figure 4:
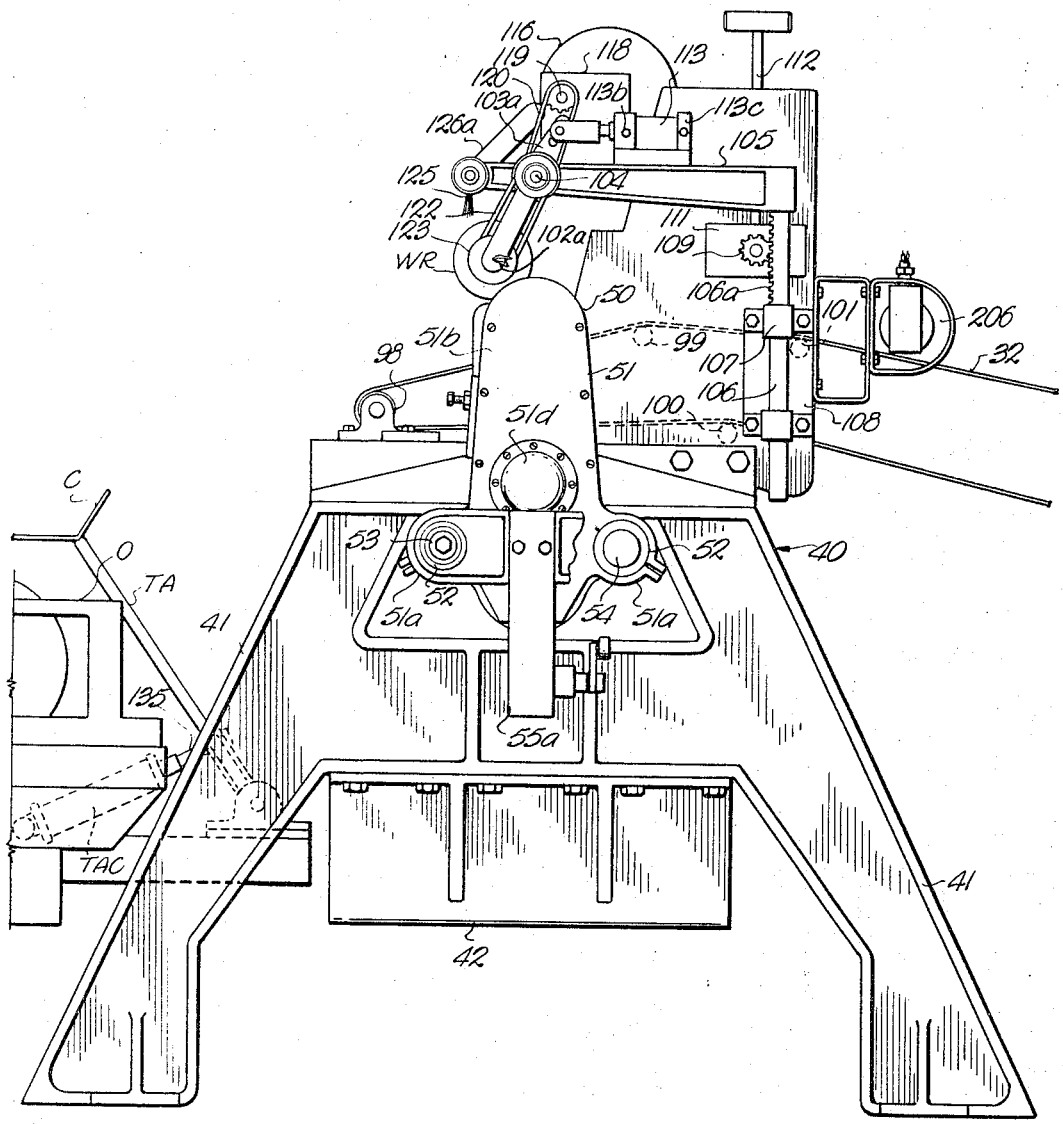
FIG. 4 is an end elevational view taken from the left hand side of FIG. 3.

Referring now to FIGS. 3–7, inclusive, and more particularly at first to FIGS. 3 and 4, the wrapping and preforming machine W comprises a spaced pair of substantially identical side members 40 which provide fore and aft supporting legs 41 on each side of the unit. A deck 42 is secured to and extends between the side members 40. On this deck is mounted a the main mandrel drive motor 43, preferably electrically powered, which is connected through a clutch and brake mechanism 44 to a drive pulley 45. Pulley 45 is in turn drivingly connected with a driven pulley 46 secured to a hollow main shaft 47 spanning between and journaled in the opposite side members of the machine by sleeve bearings 48. It will be noted that the sleeve bearings project outwardly from the side walls.

The heated mandrel WM is supported between the two side members 40 of the frame, the two half lengths thereof being seen at WM1, WM2 in FIG. 3. The inner ends of sections WM1, WM2 abut at 49. The outer ends of the respective half lengths are carried by horizontally reciprocable heads 50. Since the heads are substantially identical in construction except for being right hand and left hand, the details of construction, which appear in FIGS. 7 and 3, of only one have been shown. The mandrel lengths WM1, WM2 extend respectively from their connections with the respective heads through floating bushings 80 detailed in FIGS. 9–12, inclusive, and later to be described.

Each head 50 comprises a housing 51 which has near its lower end, oppositely and laterally extending ear portions 51a which contain bearing sleeves 52. It will be noted from FIGS. 3 and 5 that supported by and between the side members 40 and extending therefrom through the side members outwardly on opposite sides of the machine are parallel horizontal guide rods 53, 54, respectively. These rods provide the necessary support for the reciprocable heads 50 during their movement, the bearing sleeves 52 being fitted thereover in a low friction sliding fit. The rods 53, 54 have at each end a tie bracket 55 (FIGS. 3 and 4) to which they are secured, and by which they are maintained at their outer ends in spaced parallel relationship. Each bracket 55 has a depending leg 55a to which is secured an inwardly extending brace member 56 which returns to and is secured to the side support for deck 42. These braces provide mountings for the outer limit switches OLS1 and OLS2, and inner limit switches ILS1, ILS2. These are engaged and actuated as the inner and outer limits of movement of the heads 50 are reached, and their function will later be described.

Reciprocation of the heads is effected by means of a pair of aligned double acting hydraulic cylinders 57 firmly secured to and supported by the side frame members 40 and having the oppositely extending piston rods 58. The fluid connections 57a, 57b at the opposite ends of the respective cylinders are supplied from valves later to be described. The rods are connected inside the cylinders to the pistons 58a.

The manner of connecting the respective piston rods with their associated heads is best seen in FIG. 8. The head casing or housing 50 is provided with a central tubular portion 59 which has inserted therein a tubular sleeve 60. Disposed within this sleeve is a piston 61 in the form of an annular ring keyed to rod 58 by a transverse pin 62. The piston 61 is circumferentially grooved to receive an O-ring 63 providing a seal between the piston and sleeve 60. End caps 64 are tightly fitted into the opposite ends of sleeve 60, the inserted portions of the end caps carrying O rings 65, and a seal 66 is provided around the rod 58 on the insides of the caps. The sleeve 60, piston 61 and end caps 64 define two air cushion chambers 66a, 66b at opposite ends of the piston. Air lines 67a, 67b communicate respectively with these chambers, the flow being controlled by valves later to be described.

A cover 68 apertured to loosely receive the rod 58 is secured to the open end of tubular portion 59, as by bolts 69. This holds the outer end cap 64 in place. The inner end cap 64 bears against an apertured partition 70 through which the rod 58 extends. The outer end of the rod 58 has secured thereto a spring retainer disk 71 which is threaded onto a stem 72. The stem 72 is connected with the rod 58 by a socket portion 72a telescoped over the rod end and secured thereto by transverse pin 73. A compression spring 72b surrounds stem 72 and the adjacent portion of rod 58, bearing at its outer end against the retainer disk 71 and at its inner end against the partition 70 through spring washer 72c. The end cover 51b for the casing 51 includes an opening 51c aligned with disk 71, and this opening is covered by a convex cup-like member 51d, permitting limited longitudinal movement of disk 71 relative to the head.

The mandrel sections WM1, WM2 each extend from and are mounted to a rotary shaft 74 which is supported by bearings 75 in a tubular housing 76 at the upper end of the head 50 carrying the mandrel section. The shaft 74 has secured and keyed to its outermost end a pulley 77 by which the shaft is driven, as will subsequently be seen.

The medial portion of shaft 74 is hollow and contains conductors (not shown) which are connected with four commutator rings 74a mounted on the shaft by insulators 74b. Brushes 74c provide electrical connection between rings 74a and leads 74d.

Figure 8A:
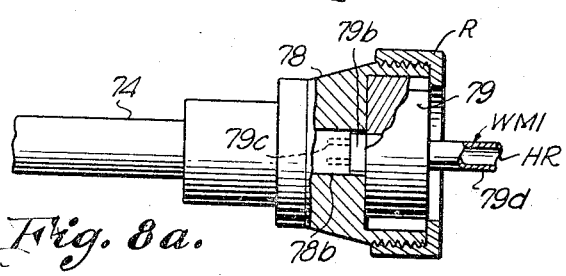
FIG. 8a is an enlarged fragmentary partly sectional view illustrating the connection between a mandrel section and its supporting hub.
Figure 8B:
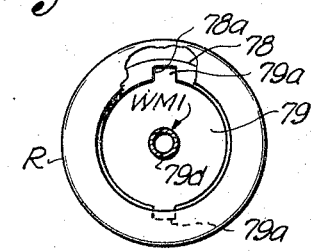
FIG. 8b is a sectional view taken along line 8—8 of FIG. 8a in the direction of the arrows.

Referring also to FIGS. 8a and 8b, it will be seen that shaft 74 terminates at its right hand end in an enlarged hub portion 78 provided with an axial socket into which is inserted the plug-like member 79 at the end of the mandrel section. The hub socket has longitudinal key slots 78a into which fit key flanges 79a on opposed sides of the plug-like member 79 so that the mandrel section is connected with the hub for rotation therewith. A retaining collar R is threaded onto the hub to hold the member 78 therein with the mandrel section in alignment with the axis of rotation.

The plug-like member 79 carries internally an electric plug 79b having axial blades 79c which are received in a jack 78b mounted within the hub. Internal conductors (not shown) connect commutator rings 74a with the jack 78b. The blades of plug 79b are electrically connected with the heating and thermostat elements within the mandrel section by conventional conductors (also not shown).

Figure 8C:
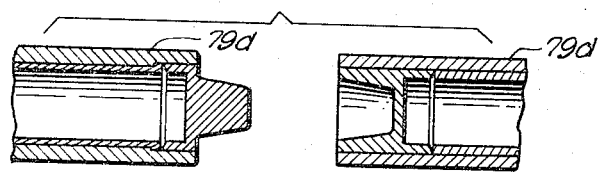
FIG. 8c is a fragmentary enlarged sectional view illustrating the configuration of the mandrel section ends, the mandrel sections being shown in slightly separated relationship.

The mandrel sections WM1, WM2 each comprise tubes 79d firmly secured to and extending from the member 79 and which contain a conventional electric heating element having built in thermal elements and in the form of a rod HR. At their outer ends the tubes respectively are provided with cooperating tapered tip and socket portions as illustrated in FIG. 8c so that when the mandrel sections come into abutment, they will interchange in axially aligned relationship.

As shown in FIGS. 9–12, inclusive, each mandrel section WM1, WM2, extends through a floating bushing 80, fitted into and extending from one side of a bushing mounting and stripper plate 81. This plate is so mounted to the frame side 40 as to have limited floating motion in a plane normal to the axis of the mandrel. To accomplish this it will be noted that the plate 81, which has a semicircular plan, is positioned with its major portion overlying a semicircular cutout having edge 82 formed in the side member 40. On the inner side of side member 40, the cutout is enlarged radially to provide a surface 83 against which the margin of the adjacent base of the plate 81 seats, and an annular shoulder 84 spaced from the rim of the plate. The plate is connected with the side member 40 by bolts 85 having countersunk heads 85a on the inside face of plate 81, so that their outer surfaces are flush with the surface of the plate. The bolts extend loosely through oversize apertures 86 in the side member and terminate in threaded reduced diameter portions 85b onto which are threaded nuts 87. The oversize apertures, plus the spacing between the edge of the plate and shoulder 84 provide a free floating action for the bushing and plate which allows a close tolerance to be provided between the bushing and mandrel without causing binding in event of misalignment of the mandrel.

Synchronized rotation is imparted to the mandrel half sections WM1, WM2, through the drive mechanism now to be described. As previously noted, the main motor 43 drives a centrally disposed horizontal hollow shaft 47. Extending from the lower end of each head 50 inwardly toward and aligned with shaft 47 is a splined shaft 88 which telescopically fits within the hollow main shaft 47. The latter is internally splined to mesh with the splines of shafts 88, and thus the splined shafts are drivingly connected with the main shaft at all times during reciprocation of the heads.

As noted from FIGS. 7 and 8, each splined shaft 88 is journaled in ballbearing 89 carried by the casing 51. Secured to the outer end of the shaft is a drive pulley 90 around which is trained the drive belt 91.

Belt 91 extends upwardly in the housing, the opposed flights being spaced on opposite sides of the shock absorber spring 72b, and is trained about the pulley 77 secured to the end of the mandrel hub shaft 74. To provide means for effecting an efficient driving connection between pulleys 90 and 77, an adjustable belt tightener having the pivotal arm 93 and belt engaging roller 94 is positioned intermediate the pulleys. The arm 93 is pivoted on a pin 95 supported on the inside of the housing 51. An adjustment bolt 96 is threaded to a plate 97 on the housing and engages at its inner end the side of arm 93, and provides a means for controlling the tension in the drive belt 91.

Figure 5:
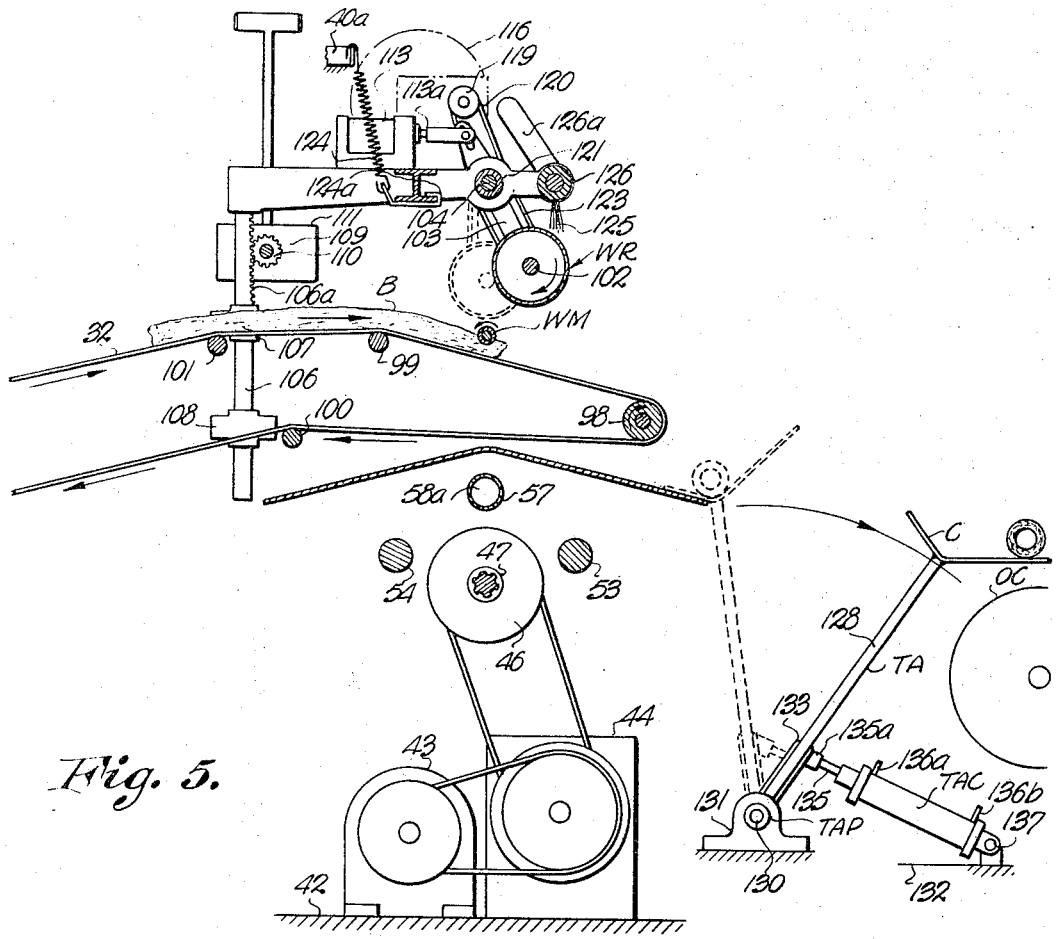
FIG. 5 is a partially schematic central cross section through the main operating components of the wrapping and transfer assemblies, being taken generally along the line 5—5 of FIG. 3 in the direction of the arrows.
Figure 6:
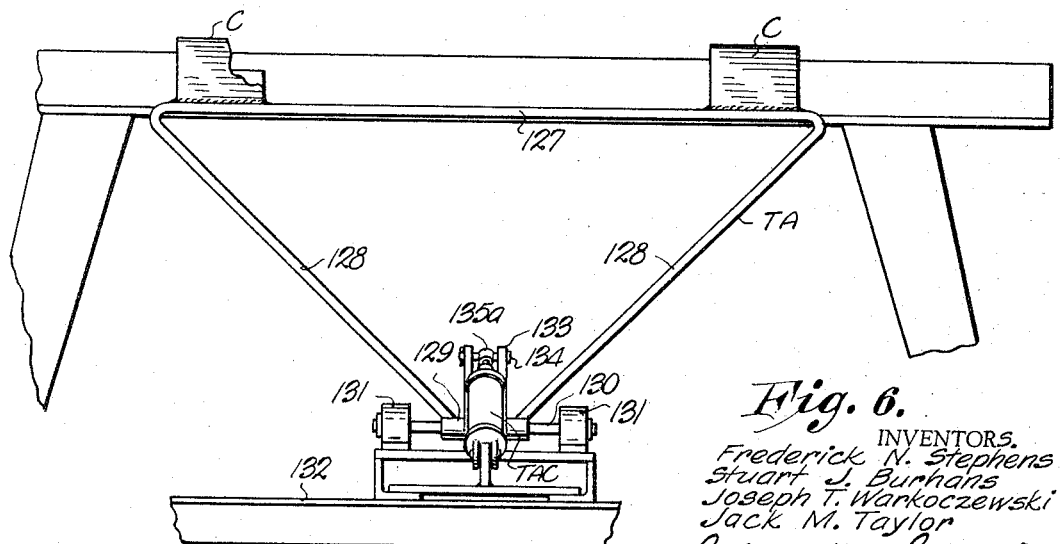
FIG. 6 is an enlarged end elevation of the transfer assembly, being taken generally from the lefthand end of FIG. 4.
Figure 9:
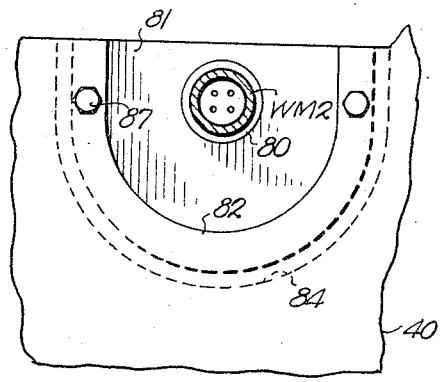
FIG. 9 is a greatly enlarged fragmentary section through the mandrel, and looking at the floating bushing, being taken generally along the line 9—9 of FIG. 3 in the direction of the arrows.
Figure 10:
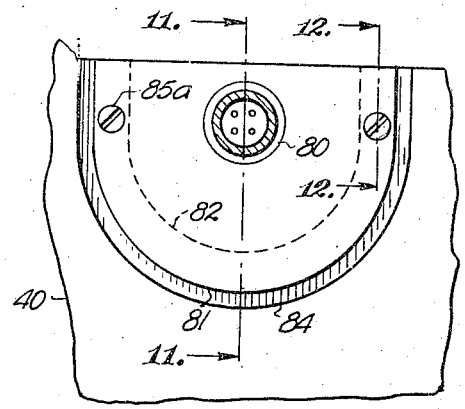
FIG. 10 is a view corresponding to FIG. 9, but taken from the reverse side of the structure shown in FIG. 9.
Figure 11:
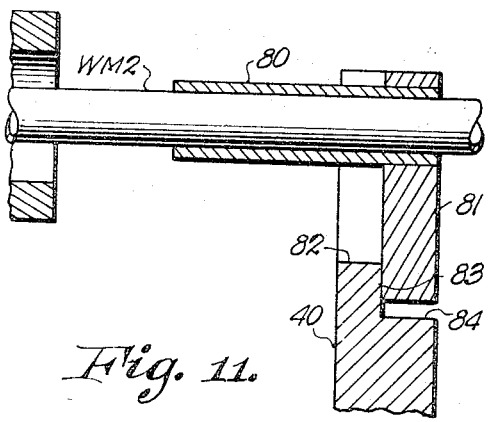
FIG. 11 is a sectional view taken generally along the line 11—11 of FIG. 10 in the direction of the arrows.
Figure 12:
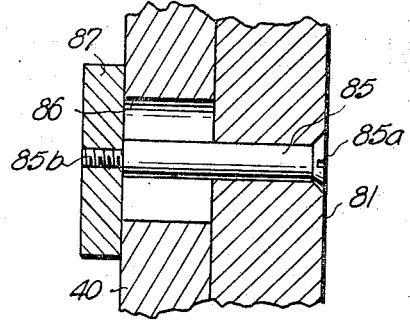
FIG. 12 is a greatly enlarged fragmentary cross section taken along line 12—12 of FIG. 10 in the direction of the arrows.

As best seen in FIG. 5, the conveyor belt 32 is so positioned and supported relative to the mandrel WM that it passes closely thereunder on a slight downward incline. The spacing of the belt from the mandrel is determined principally by the wall thickness to be given the tubular object, the spacing being substantially equal to the wall thickness desired in the final product. Suitable support rollers 98, 99, 100 and 101 have their ends journaled in conventional rotary bearings on the opposite side members 40. As earlier mentioned, belt 32 can be independently driven by its own motor (not shown), connected with the large drive roller at the input end of the machine (see FIG. 1).

Supported above the mandrel WM and swingable toward the mandrel from the solid line position of FIG. 5 to the broken line position is the relatively large diameter finish roller WR. This roller is of hollow metallic construction and is heated by an internally disposed electric resistance heating rod 102 having the leads 102a seen in FIG. 4. The outer surface of roller WR should be quite smooth.

The ends of the roller WR are rotatably journaled by and supported between two depending spaced parallel arms 103. Each arm in turn is journaled for pivotal movement about an axle 104 extending from one side of a corresponding horizontal lift arm 105 at the side of the machine.

The lift arms 105 are each supported in cantilever fashion from the upper ends of vertical shaft 106 which extends through and is confined for up and down sliding movement in upper and lower bushings 107, 108. The bushings are secured to the side members 40 of the machine. Each shaft 106 has near its upper end a gear rack segment 106a. Pinions 109 mounted in common on a shaft 110 mesh with the respective rack segments. A hand wheel 110a (FIG. 3) connected with one end of shaft 110 provides means for simultaneously raising or lowering the lift arms 105, and thus changing the spacing of roller WR from the mandrel. A simple manually operable set brake assembly of conventional construction is shown at 111, the brake assembly having the vertical operating shaft 112. The brake assembly 111 cooperates with shaft 110 and provides means for locking the shaft 110 against rotation so as to preserve a desired spacing between the roller and mandrel.

Pivotal displacement of roller WR from one position to another is affected by the actuation of double acting air cylinders 113, one each being secured to the upper surface of a lift arm 105. As best seen in FIGS. 4 and 5, each cylinder has a piston rod 113a which is connected by the usual clevis joint with an upward extension 103a on its associated roller carrying arm. Air lines 113b, 113c are provided at the opposite ends of the cylinders for connection with a control valve later to be described.

The roller WR is driven by an electric motor 116. The motor is supported on a cross piece 117 extending between and secured at its ends to lift arms 105. The motor drives a speed reducer 118 having the sprocket 119 on its output shaft. A first chain 120 is trained about sprocket 119, and about one sprocket of a two sprocket idler hub 121 which is rotatably journaled around axle 104 through lift arm 105. The other sprocket of the idler hub is connected with a driven sprocket 122 by means of a second chain 123. Sprocket 122 is connected with the roller WR and is operable to rotate same. Since hub 121 is rotatable on the pivot axis of arms 103, it will be evident that drive to the roller is maintained as the roller is pivoted between its up and down positions.

In order to facilitate adjustment of the elevation of the lift arms 105, the lift arm assembly is counterbalanced by means of tension spring 124 having one end connected with cross member 117, as by hook 124a, and the other end to a suitable bracket 40a on the frame of the machine.

The roller assembly also includes the roller cleaning brush 125. This brush preferably comprises a rod 126 disposed parallel with the roller WR and rotatably supported for limited rotation about its own axis between the outer ends of lift arms 105. The brush tufts are directed toward the roller and are so positioned as to engage the surface of the roller and clean same when the roller is brought to the up position. A handle 126a is keyed to brush 125 and can be employed to rotate the brush to a point where foreign matter collecting thereon can in turn be removed by plucking or scraping it therefrom.

It may be best at this point to describe the general operation of wrapping and preforming apparatus somewhat further. In preparing the apparatus for operation, the drive motor for belt 32 is started, the belt being driven at constant speed. The mandrel motor 43 is also started and is set to a speed at which the surface speed of the mandrel is substantially greater than the linear speed of the conveyor belt 32. The mandrel sections are heated to a surface temperature sufficiently high that when the uncured pelt B comes into contact therewith, the binder in the pelt will preliminarily adhere directly to the mandrel with sufficient integrity as to cause the mandrel to whip the pelt ahead and from its position on conveyor belt 32 and wrap it tightly about the mandrel in a plurality of wound-on layers. For the ordinary binders a temperature of 750° F. to 1000° F. has proved satisfactory, and a mandrel speed range of (for mandrel diameters between ½ inch and 1 inch) 100 r.p.m. to 450 r.p.m. with a belt speed of around 65 feet per minute.

During the wrapping of the pelt on the mandrel, the motor 116 continues to drive roller WR, but the roller is in the "up" position, the cylinders 113 being actuated in a direction to hold the roller arms 103 up. The speed of the roller WR is set so that its peripheral speed at the surface is substantially equal to the belt speed.

As the pelt is wrapped about the mandrel, the drag exerted by the belt 32 on the trailing end of the pelt tends to pull the pelt into a tight wrap. In other words, since the mandrel in effect pulls the pelt forwardly relative to the belt, there is an inertia reaction, as well as frictional drag, both of which serve to put the trailing portion of the pelt in tension. This causes the wound portion to be wrapped fairly tightly on the mandrel at a density much greater than that of the advancing pelt. Obviously, the wrapped density is a function of the relative speeds between the mandrel and the belt.

When the pelt is completely wrapped on the mandrel, the speed of the mandrel is reduced to what is hereinafter termed the "finish speed." Change in speed is made by controlling motor 43. The finish speed is one at which the peripheral speed of the wrapped build-up on the mandrel is substantially equal to the linear speed of belt 32. At the same time, air cylinders 113 are actuated to swing roller WR down to the broken line position, in which the surface of the roller is spaced at its nearest point to the mandrel a distance equal to the desired final thickness of the tubular article. Rotation of the mandrel and roller is continued and the mandrel, belt and roller cooperate to press and preliminarily form the outer surface into a uniform cylindrical shape. The roller WR is heated to a temperature which is sufficient to prevent adherence of the outer surface to the roller, a recommended temperature range being 500° F. to 600° F.

The article is retained on the mandrel until such time as the binder adjacent the mandrel has cured sufficiently to form a thin, tough internal skin or core as shown at CR in FIG. 2. We have found that this can be accomplished in a matter of seconds, 10 to 15 seconds being ample with the mandrel temperatures noted earlier. The major portion of the binder in the build-up does not cure out during this interval. However, the internal skin becomes strong enough to provide the necessary internal support to maintain the article in tubular shape when the mandrel is withdrawn.

When the curing of the internal core has taken place, roller WR is again raised by actuating cylinders 113. The mandrel sections WM1, WM2 are then withdrawn by actuating hydraulic cylinders 57 in a direction to force heads 50 outwardly to the broken line positions of FIG. 3. Since the heads 50 carry the mandrel sections, the latter are withdrawn from the opposite ends of the article and it is free to move downwardly and forwardly toward the transfer apparatus TA shown in FIG. 1.

Sharp clean separation of the mandrel sections from the core of the article is achieved in part through the special manner of connection of each of the heads 50 with its thrust rod 58. Referring again to FIG. 8, it will be noted that as the rod 58 starts outwardly, the inertia of the head, as well as any internal resistance in the article to withdrawal of the mandrel section tends to hold the head stationary. Initially, both chambers 66a and 66b are at atmospheric pressure. As rod 58 starts outwardly (which is a rapid movement), pressure builds up in chamber 66a. However, a low pressure pop-off valve 67c relieves this pressure and allows the piston to strike sharply against the inner end cap 64 and provide a sharp jar or impact on the head at the start of the mandrel movement.

When the head 50 reaches its outer limit of travel, the inertia of the mandrel section and its associated parts causes sleeve 60 to shift to the left on piston 61. The shock is absorbed by spring 72b and by the pressure build-up in chamber 66b. On the return stroke, piston 61 is located at the extreme right hand end of the sleeve cylinder, and so obviously when the head reaches the inner limit of travel, the confronting inner ends of the respective mandrel sections will be still separated. At this point, valve 67d is cycled to successively introduce pressure to chamber 66a and reconnect it with the atmosphere. Air will thereafter slowly bleed from chamber 66a at a controlled rate through restriction 67f and the ends of the mandrel sections are thus permitted to come gently together during the last phase of inward travel.

While we have found that clean separation of the mandrel sections from the tubular article can be achieved while the mandrel is still turning at its lower "finish" speed, it may be desirable in some cases to stop the mandrels entirely prior to actuation of the heads and to restart the mandrel when the heads have been returned to the normal position. This can be accomplished by providing appropriate controls on the brake and clutch mechanism between motor 43 and the main drive shaft 47.

Upon return roller WR is still in the up position and the unit is ready to receive, wrap and preform another blank or pelt of green or uncured mat in the fashion described above.

The transfer and final cure apparatus

When the cured article is detached from the mandrel, as previously noted, it drops downwardly and forwardly toward the transfer apparatus TA and into the spaced cradles C thereof.

The cradles C are generally V-shaped and are carried at the upper end of a generally triangular frame having the horizontal leg 127 to which the cradles are secured, and the converging side legs 128. The latter are secured at the lower ends to a sleeve 129 surrounding and keyed to an axle 130. Axle 130 is journaled at its opposite ends in bearings 131, which in turn are supported on a rigid base 132 which may conveniently be secured to and supported from the wrap up frame.

Sleeve 129 has extending radially therefrom a pair of spaced lugs 133. Between the outer ends of these lugs is pivotally connected, as by pin 134, the outer end cap 135a of a piston rod 135. Piston rod 135 forms part of the double acting air cylinder TAC having air connections 136a, 136b at the opposite ends of the cylinder. The cylinder body is pivotally connected with base 132 by pivot pin 137.

The transfer apparatus is so constructed that cradles C are reciprocating between the solid and broken line positions of FIG. 5. In the up or broken line position the cradles are below and slightly in advance of the nose of conveyor 32 and in position to receive the tubular article as it descends over the nose. Because of the broad V-shape of the cradles the article will align itself in the cradles. When piston rod 135 is retracted, the cradles C are swung in an arc toward the oven conveyor OC and gentle deposit of the article thereon by rolling off the legs of the cradles takes place.

Because of the construction and operation of the cradles, the article is delivered to the oven conveyor with its axis normal to the path of advance or parallel with the oven conveyor support rollers. It is thus in proper position to be carried forward under the static screen SC (FIG. 1) and to move thereunder in reverse rolling fashion through the length of the oven during final cure.

The automatic control system

Figure 13:
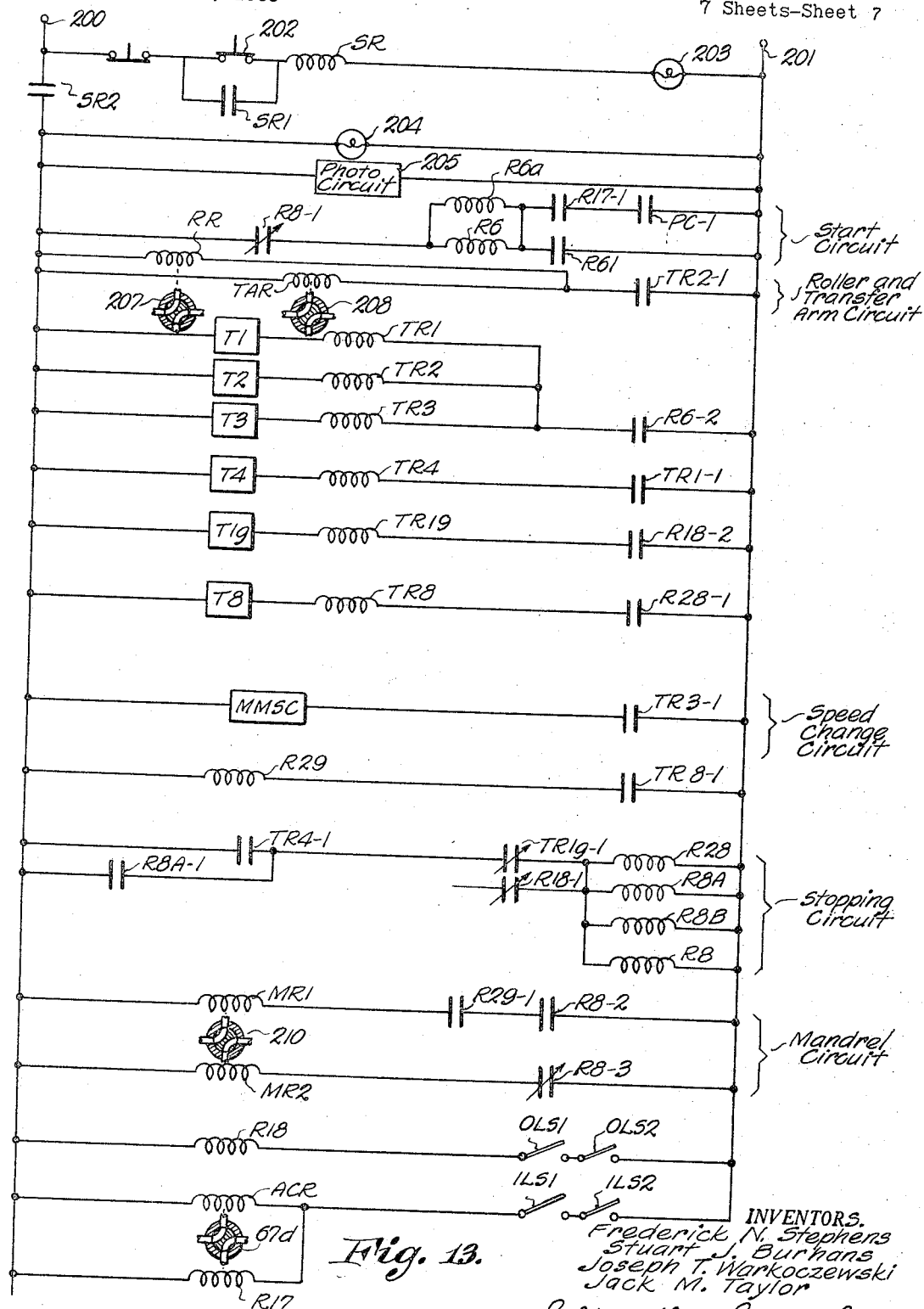
FIG. 13 is a schematic and diagrammatic view showing the control means for the invention.

To effect automatic sequential control of the wrap-up and perform apparatus and to properly relate it to the transfer mechanism, the arrangement and circuitry shown in FIG. 13 can be utilized.

The control circuit is energized from a pair of terminals 200, 201 which may be connected to any appropriate source of potential (not shown).

The control operation is commenced by momentarily closing the start switch 202 which energizes the start relay SR and closes the starter relay contact SR1 in the circuit to hold the start relay closed upon release of the start switch. This also serves to energize the incandescent lamp 203 which provides a visual indication that the control circuit is energized. It will be understood that at this time drive motor 43 has already been separately energized and is driving the mandrel WM at the wrapping speed, motor 116 is rotating roller WR at the wrapping speed, the conveyor 32 is being driven at its pelt feeding speed and the hydraulic and air systems are set so that the components are in the positions shown in solid lines in the drawings.

Upon closing of the start switch, SR2 closes to arm the circuit, and an incandescent lamp 204 is energized, this lamp forming part of the photoelectric control having the phototube circuit 205. This circuit is under the control of the photoelectric tube 206 (FIGS. 1 and 4) which is positioned to one side of belt 32 ahead of the mandrels WM. The lamp 204 is on the opposite side of the belt and arranged so that its beam is received on the phototube. The phototube circuit is not shown in detail since it is well known, it being sufficient to observe that it is such that whenever light from lamp 204 falls on the photoelectric tube 206, the phototube relay winding R6 is not energized. Whenever the lamp beam is interrupted by the leading end of an advancing pelt B, the deenergization of the tube causes energization of relay winding R6 by closing photocell contact PC1, assuming that normally open relay contact R17–1 is closed. If the condition of the unit is normal this contact will be closed since its winding R17 is controlled by the innerlimit switches ILS1 and ILS2 which are closed when the heads 50 are in their innermost positions.

Upon the energization of winding R6 it is locked in by the closing of R6–1. At the same time, its second contact R6–2 closes, thus energizing timers T1, T2, T3.

The timers each are of the known type that upon energization begin timing out and at the end of the selected time interval cause energization of a timer relay. The respective timer relay windings are indicated at TR1, TR2, TR3.

The timer T2 is the first to time out, closing contact TR2–1 and energizing the windings RR and TAR of the solenoid actuated valves 207 and 208. Valve 207 controls the air supply to the heated roller actuating cylinders 113 and valve 208 controls the transfer arm cylinder TAC. Energization of the solenoid windings causes each valve to effect the shift of the roller WR and transfer arm to the broken line positions of FIGS. 1 and 5. The timed interval need only be sufficient as to permit the pelt B to be wrapped on the mandrel before the roller moves to the broken line, or "down" position.

Timer T3 times out at about the same time and energizes its relay winding TR3, thereupon closing contact TR3–1 which controls a speed change circuit through the mandrel motor feed control MMSC. The latter controls the speed of mandrel drive motor 43 and operates, when energized, to reduce the speed of the mandrel to the "finish speed" earlier described. A conventional speed controller may be used and no further detail is believed required.

Next in sequence, timer T1 times out, energizing its relay winding TR1 and closing its contact TR1–1 in the circuit to a timer T4 and starting same on its time cycle. Timer T4 times out, and as it does it energizes its winding TR4, thus closing contact TR4–1 in the stopping circuit. Relay windings R28, R8B, R8A and R8 are thereupon energized. It will be noted that relay winding R8A closes a contact R8A–1 and establishes a circuit around contact TR4–1, thus locking in the windings in the stopping circuit. The energizing of winding R8 opens a normally closed contact R8–1 in the start circuit thus deenergizing and dropping out windings R6 and R6A. The dropping out of relay R6 opens contacts R6–1 and R6–2 breaking respectively the locking circuit and the circuits through timers T1, T2 and T3. The timers thereupon reset for another cycle. At the same time, contact TR2–1 in the roller circuit opens, and the heated roller and transfer arm are returned to the solid line positions by operation of valves 207 and 208.

The energization of relay winding R28 closes the contact R28–1 in the circuit of timer T8 and starts the time cycle of T8. As the latter times out, it energizes winding TR8 and closes contact TR8–1, which in turn energizes relay winding R29. This winding closes contact R29–1 in the mandrel circuit, and since contact R8–2 has already been closed (upon energization of winding R8), the valve solenoid MR1 is energized, shifting the mandrel position control valve 210. The valve 210 controls hydraulic fluid flow to the double-acting cylinders 57. When it is actuated by solenoid winding MR1, the fluid is directed into lines 57a (FIG. 3) thus forcing heads 50 outwardly as previously described and separating the mandrel sections. Normally, the valve is maintained in the opposite position by solenoid winding MR2; however, it will be noted that enegization of relay winding R8 at the end of the T4 time cycle opens the contact R8–3 and thus winding MR2 is deenergized prior to the energization of winding MR1.

When the mandrel heads 50 come out, limit switches OLS1 and OLS2 will close. This results in energization of relay winding R18 and opens contact R18–1 in the stopping circuit. However, the stopping circuit will remain energized through the normally closed contact TR19–1.

The contact TR19–1 is controlled by the winding TR19 of timer T19. T19 is energized by the closing of contact R18–2 in response to the mandrel heads reaching the outermost position. The timer T19 operates to delay the return of the mandrel heads sufficiently as to permit the tubular article be cleared from the withdrawn mandrel sections and drop into the transfer arm cradle TAC. When T19 times out, its winding TR19 is energized, opening the normally closed contact TR19–1 in the stopping circuit.

When timer T19 times out, the normally closed contact TR19–1 in the stopping circuit opens, thus dropping out relay windings R28, R8B, R8A and R8 and breaking the locking circuit through contact R8A–1. When the stopping circuit relay windings drop out, relay winding R29 is de-energized (through opening of contact R8–1) and energization of mandrel relay winding MR2 occurs. The latter serves to reset valve 210 to its original position, causing the head cylinders to return the heads 50 toward the original position. As the heads close the innerlimit switches ILS1 and ILS2 are closed, and the air cushion valve 67–d is actuated, as earlier described, by energization of winding ACR. Winding R17 is also closed and contact R17–1 is thereupon closed. The control circuit is now ready for another complete cycle which is instituted when the next piece of green mat or pelt interrupts the beam to the phototube.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In a method of manufacturing tubular articles from a flexible mat of fibers and intermixed uncured heat reactive binder, the steps of rapidly rotating a highly heated mandrel about its longitudinal axis, advancing said mat laterally toward and into contact with said mandrel, adhering a portion of the mat to said mandrel by the binder in said mat whereupon said mat is wrapped rapidly and tightly about the mandrel by the rotation of the mandrel to form a tubular build-up, maintaining said build-up on the mandrel a period of time sufficient to form a cured, dimensionally stable skin on the interior surface of the build-up, withdrawing the mandrel from the build-up, and further heating the mandrel-free build-up to cure the remainder of the binder.

2. A method as in claim 1 including the step of slowing the rate of mandrel rotation, after formation of the build-up, to a value at which the peripheral speed of the build-up is substantially equal to the speed of the support.

3. A method as in claim 1 wherein the mat is advanced on a moving support toward said mandrel and the peripheral speed of the mandrel is greater than the speed of the support.

References Cited

UNITED STATES PATENTS

| | | | |
|---|---|---|---|
| 2,503,041 | 4/1950 | Greene | 156—184 X |
| 3,063,887 | 11/1962 | Labino | 156—446 X |
| 3,093,532 | 6/1963 | Miller et al. | 156—184 X |
| 3,121,253 | 2/1964 | Varrial | 156—455 X |

EARL M. BERGERT, *Primary Examiner.*

P. DIER, *Assistant Examiner.*